United States Patent [19]

Carey et al.

[11] Patent Number: 4,491,884
[45] Date of Patent: Jan. 1, 1985

[54] METHOD OF MONITORING HEAD ALIGNMENT IN A MAGNETIC DATA STORAGE DEVICE

[75] Inventors: Kevin J. Carey; Brian Hanlon, both of Limerick, Ireland

[73] Assignee: Verbatim Corporation, Sunnyvale, Calif.

[21] Appl. No.: 471,008

[22] Filed: Mar. 1, 1983

[51] Int. Cl.³ .......................... G11B 5/46; G11B 21/02
[52] U.S. Cl. ...................................... 360/75; 318/565; 369/56
[58] Field of Search ............... 360/75, 77, 78; 369/55, 369/56, 57; 318/565

[56] References Cited

U.S. PATENT DOCUMENTS 3,670,316  6/1972  Matthews et al. ............... 369/55 X
4,136,365  1/1979  Chick et al. ........................ 360/78

Primary Examiner—George G. Stellar
Attorney, Agent, or Firm—Thomas E. Schatzel

[57] ABSTRACT

A method for monitoring the alignment of the read-write head of a magnetic media data storage device comprising the steps of: establishing an elasped time window during which the read-write head should pass through a predetermined position if the head alignment has not drifted; checking to determine if the actual time at which the read-write head passes through said position actually falls within said window; and providing a pair of signals for indication of alignment or misalignment.

8 Claims, 2 Drawing Figures

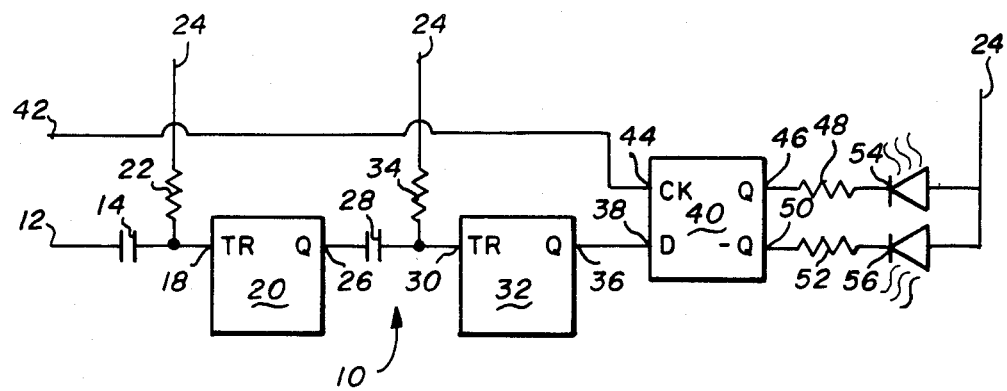
Fig_1
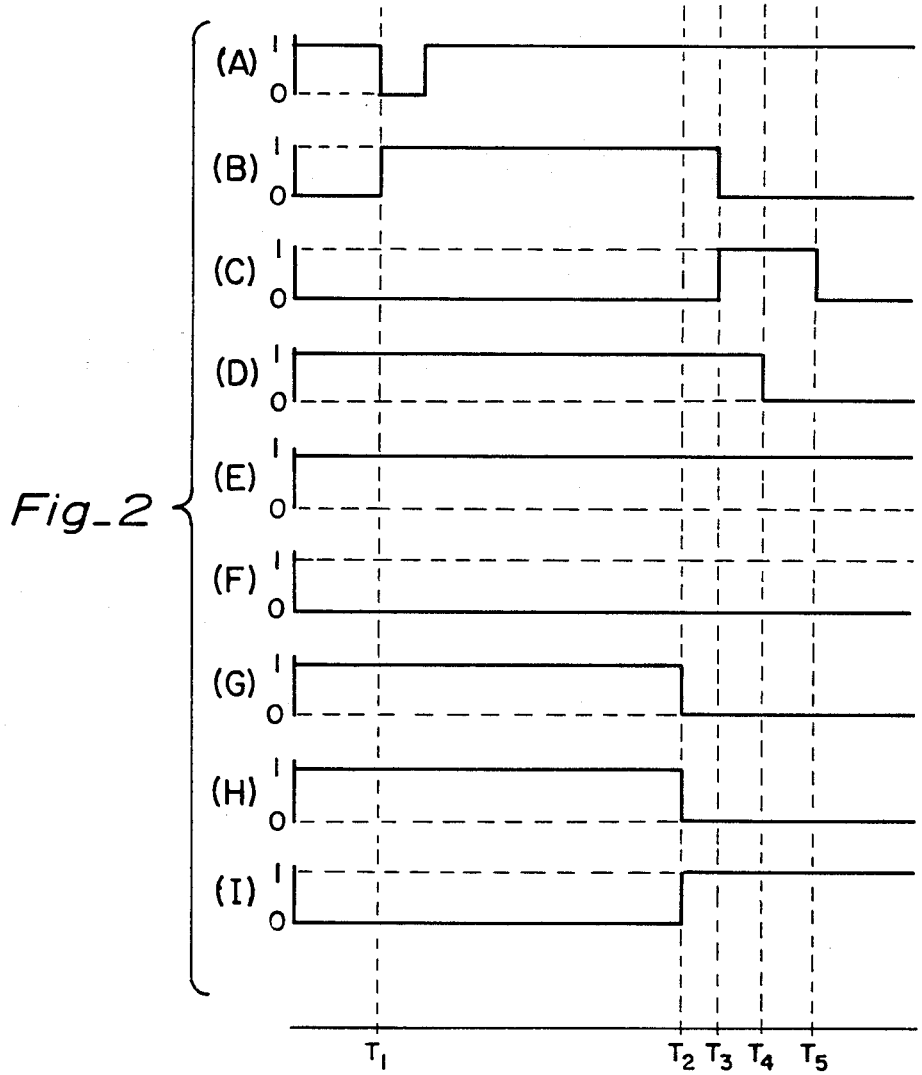
Fig_2

METHOD OF MONITORING HEAD ALIGNMENT IN A MAGNETIC DATA STORAGE DEVICE

BACKGROUND OF THE INVENTION

1. Field of the Invention

The invention relates to the field of magnetic media data storage devices and more particularly, to methods of detecting misalignment of movable read-write transducer heads with respect to magnetic media. Magnetic media data storage devices have data arranged on the magnetic media in tracks, and a read-write transducer head is movable across the media such that it can be aligned with any of the data tracks on the media. The head must be accurately aligned with the desired data track for effective transfer of data. The more closely the tracks are spaced together, the more data can be stored on a given sized media, but the more critical the alignment of the head becomes. A typical application of the present invention is on a data storage utilizing a magnetic disk as the data storage media. A disk is a plotter-like element having magnetic material coated or plated on, or incorporated in, one or both surfaces of said element and primarily designed for magnetically storing digital information by recording while said element is rotating. Magnetic-disk data storage devices are made with a great variety of size and sophistication. Constantly competing design criteria involve attempting to increase performance while attempting to decrease cost. One of the significant factors controlling the characteristics of various data storage devices currently available is how the particular designer balanced those particular competing criteria. In the large, high density storage devices, some fairly elaborate systems of controlling head alignment can be justified. In the lower priced devices, not much can be spent controlling precision alignment.

2. Description of the Prior Art

A fairly elaborate system of control of head alignment is described by Chick, et al in U.S. Pat. No. 4,136,365. Chick discloses a system utilizing a special disk with built-in reference tracks, and provides for an intermittent process of checking the alignment of the head with respect to the reference tracks on the disk, and then making adjustments to compensate for any alignment error.

While a system which requires a special disk and which automatically compensates for misalignment can be justified on large high density storage devices, the tendency with regard to the lower priced, less sophisticated devices is to simply have the alignment routinely checked at the time of servicing through a manual alignment process. A disadvantage of having alignment checked only when the device is serviced, is that if alignment drifts, not only may it be an undetected cause of data reading errors, but data recorded on a disk while the head is out of alignment may be lost when the head alignment is corrected.

SUMMARY OF THE PRESENT INVENTION

It is therefore an object of the present invention to provide a new method of monitoring the alignment of the read-write head with respect to the data tracks on magnetic-disks and magnetic data storage devices.

It is a further object of the present invention to provide a method whereby an indication is provided whenever a change in head alignment beyond prescribed limits occurs.

It is a further object of the present invention to provide a method whereby the above two objects can be accomplished in an economical manner, thereby enabling its incorporation into data storage devices at the lower end of the price range for data storage devices.

Briefly, the present invention includes the actuation of a first timing means for measuring a fixed interval of time at the same instant that the read-write head begins to move from its power-off resting position. When said first timing means completes its interval, a second timing means for measuring a fixed interval of time is activated by a signal from said first timing means. The period timed by said second timing means begins at a specific time after the initiation of movement of the head, determined by said first timing means, and ends when said second timing means has completed its timing. That precise period of time is referred to as a window. The read-write head disengages a position sensing means, referred to as a TKO switch, when it has moved to a predetermined position some distance from its power-off resting position. The change of state of said TKO switch is used as a clocking pulse to initiate a check of the status of said second timing means to determine if the change of state of said TKO switch occurs during said window. The intial setting of the position of said TKO switch, and the preset time intervals for the first and the second timing means are established such that when the data storage device is properly aligned, said window will begin slightly before the change of state of said TKO switch, and will end slightly after the change of state of said TKO switch. If the data storage device is jarred or damaged in such a manner that a change takes place in the time required for the head to move from its power-off rest position to the predetermined position at which said TKO switch deactivates, that change within the device is likely to have effected head alignment. If such a change is sufficient to place the time that said TKO switch changes state outside of said window, said check of the state of said second timing means produces a signal indicating a potential error in alignment of the head. The sensitivity of the system utilizing the above process, is decreased or increased by enlarging or deminishing, respectively, the size of the window around the point in time when said TKO switch deactivates when the head is in proper alignment.

An advantage of the present invention is that it provides a new method of monitoring the alignment of the read-write head with respect to the data tracks on magnetic-disks in magnetic storage devices.

A further advantage of the present invention is that it provides a method whereby an indication is provided whenever a change in head alignment beyond prescribed limits occurs.

It is a further advantage of the present invention that it provides a method whereby the above referred to advantages can be accomplished at an economical manner, thereby enabling its incorporation into data storage devices at the lower end of the price range for data storage devices.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a block diagram of a system for monitoring the alignment of a read-write head in a magnetic disk data storage device utilizing a process in accordance with the present invention; and FIGS. 2A to 2I are timing diagrams showing the time relationships between various signals present in the alignment monitoring system during the application of the process of the present invention.

DETAILED DESCRIPTION OF THE PREFERRED EMBODIMENT

FIG. 1 shows an alignment monitoring system referred to by the general reference character 10, intended for monitoring the alignment of the read-write head of a magnetic storage device. A first input terminal 12 accepts an input signal which is modified through circuitry consisting of a capacitor 14 by which input terminal 12 is connected to a trigger 18 of a first monostable multivibrator 20, and a resister 22 which is connected between trigger input 18 of the monostable multivibrator 20 and a positive voltage source 24. An output 26 of first monostable multivibrator 20 is connected through a capacitor 28 to a trigger input 30 of a second monostable multivibrator 32. Trigger input 30 is also connected through a resistor 34 to positive voltage source 24. An output 36 of second monostable multivibrator 32 is connected to a data input 38 of a bistable multivibrator 40. The alignment monitoring system 10 has a second input terminal 42 connected to a clock input 44 on the bistable multivibrator 40. Bistable multivibrator 40 has a first output 46, which is connected to a resistor 48, and a second output 50, which is connected to a resistor 52. Resistors 48 and 52 are connected to a pair of light emitting diodes 54 and 56 respectively, which are in turn each connected to positive voltage source 24.

The operation of the alignment monitoring system 10 occurs when a magnetic media data storage device to which it is applied is first turned on. When such storage devices are not being accessed, the read-write head is normally stored in the extreme end of its travel range, against a stop, (resting position) such that when the stored data is required, power is applied to the storage device, and the head is moved from its resting position to the track on the magnetic disk of which access is desired. A typical magnetic disk data storage device establishes the track locations by moving the head precise distances from its power-off resting position in incremental steps through use of a drive motor. While the distance that the head moves from track to track is not subject to significant variation, the distance the head moves from its resting position to the first track affects the position the head attains when it is moved to each other track. That initial travel distance of the head is therefore the major factor controlling the head alignment for all tracks.

The process of the present invention is based on the principal that any change which occurs in the elapsed time between the initiation of movement of the head away from its resting position and the instant in time when the head reaches the position over the first data track, results in a change in head alignment with respect to the data tracks on the media. Magnetic disk data storage devices are often supplied with a switch referred to as a TKO switch which is activated when the head is in the power-off resting position and is deactivated when the head is moved to a position over any of the data tracks of the disk. The actual position of the head when that TKO switch deactivates is somewhere between the head's resting position and the position of the head when it is aligned with the first data track which it encounters. The TKO switch can therefore be used as a means for sensing the position of the head and identifies when the head passes through a specific position. Just as a change in the period of time between initiation of head movement and the instant when it reaches a position over the first data track indicates a change in alignment, similarly a change in the period of time between initiation of head movement and the instant in time when the TKO switch deactivates indicates a change in alignment for the head with respect to the data tracks of the disk.

The process of the present invention monitors the period of time between initiation of movement of the head and the instant in time when the TKO switch is deactivated. If that period of time changes beyond preset limits, the process of the present invention provides an indication that the head should be realigned. Although it is possible to have the TKO switch position actually move in response to a mechanical impact and thus provide an indication of misalignment when the alignment is actually still correct, there is very little that could happen in a magnetic disk data storage device which could change the alignment without changing the elapsed time monitored by the process of the present invention. The process thus has some possibility of erroneously indicating misalignment, but very little probability of erroneously indicating correct alignment.

The actual operation of the method of the present invention as implemented utilizing the alignment monitoring system 10 shown in FIG. 1 can be understood with reference to the timing diagrams shown in FIG. 2. FIG. 2 is a group of diagrams showing the logical state (i.e., either zero or one) at various locations in the alignment monitoring systems 10 as functions of time. All of the diagrams of FIG. 2 are drawn to the same time scale so as to show the temporal relationship therebetween.

The movement of the read-write head in a typical magnetic disk data storage device is initiated by a pulse such as the one shown in FIG. 2A. The pulse there shown consists of a short duration change from logical one (high) to logical zero (low) and back to logical one (high). This pulse is utilized by the process of the present invention to initiate the timing process simultaneously with the initiation of movement of the head from its power-off resting position. The pulse shown in FIG. 2A is fed to input terminal 12 of the alignment monitoring system 10. Trigger input 18 of first monostable multivibrator 20 is held in the high (logical one) state in the absence of an input pulse on input terminal 12 by the connection to positive voltage source 24 through resistor 22. The application of a negative step in voltage like that shown in FIG. 2A to input terminal 12 results in a brief decline in the voltage to logical zero at trigger input 18. The decline to logical zero of trigger input 18 is in response to the front of the pulse shown in FIG. 2A rather than to the entire pulse, and occurs at T1. The voltage on trigger input 18 would return to logical one even if the voltage on input terminal 12 remained at logical zero instead of returning to logical one as shown in FIG. 2A. The signal on trigger input 18 is more closely related to the derivative of the signal on input terminal 12 than to the magnitude of the signal on input terminal 12, and is essentially responsive only to negative changes in the voltage on input terminal 12.

The first monostable multivibrator 20 is triggered by the signal on trigger input 18, thereby changing the state of its output 26 from a logical "zero" to logical "one" at time T1. The output of the first monostable multivibrator 20 then remains in the logical "one" state for a predetermined amount of time controlled within the mutlivibrator circuitry, and subsequently returns to logical "zero". The timing of the output 26 of the first monostable multivibrator 20 is shown in FIG. 2B which indicates that said output 26 is in the logical "one" state from T1 to T3, and in the logical "zero" state at all other times. The effect of the voltage at output 26 on trigger input 30 of the second multivibrator 32 is such that trigger input 30 sees a signal approximating the derivative of the voltage on ouptut 26 when said output 26 changes from logical "one" to logical "zero" at T3. The output 36 of the second monostable multivibrator 30 is shown in FIG. 2C, and can be seen to go from logical "zero" to logical "one" at T3 in response to the step from logical "one" to logical "zero" at output 26 of first monostable multivibrator 20. Output 36 returns to logical "zero" at T5 when second monostable multivibrator 32 has completed its timing interval as controlled by its circuitry. The voltage at output 36, and consequently at data input 38 of bistable multivibrator 40 is therefore logical "zero" at all times except for a precise time period from T3 to T5 which is controlled by the respective circuitries of the monostable multivibrators 20 and 32 and is referred to as a window.

The second input terminal 42 of the alignment monitor system 10 is connected to a means for position sensing of the head such as the TKO switch described above. The voltage on said second input terminal 42 changes from logical "one" to logical "zero" when the head passes the predetermined position sensed by the deactivation of the TKO switch. FIG. 2D represents the form of the signal which is supplied from the position sensing means to second input terminal 42, and the step from a logical "one" to logical "zero" occurs at T4. The change from logical "one" to logical "zero" corresponding to the instant in time at which the head passes the predetermined position acts as a clock signal for bistable multivibrator 40. When bistable multivibrator 40 receives such a clock signal, first output 46 will take whatever logical state is present at data input 38. Thus when clock input 44 receives a change in state from logical "one" to logical "zero", if data input 38 is at logical "one", then first output 46 will become logical "one", and if data input 38 is logical "zero", then first output 46 will become logical "zero".

When the read-write head in the data storage device is in proper alignment, the time T4 at which the position sensing means deactivates is largely determined by the mechanical design of the data storage device itself. It is obviously effected by the speed at which the head is designed to move, as well as the location of the power-off resting position and the physical location of the position sensing means. The value for T4 is thus influenced greatly by considerations independent of the alignment monitoring process. The value of T3 is controlled by the circuitry of the first monostable multivibrator 20 and the value of T5 is controlled by the circuitry of both monostable multivibrators 20 and 32. The circuitry of monostable multivibrators 20 and 32 is selected and adjusted such that when the head is in alignment, T3 is slightly before T4 and T5 is slightly after T4. The difference in time between T3 and T5 forms a window which acts as the limits over which T4 could vary with the alignment monitor system 10 still indicating that the head is in alignment. This is the condition reflected in FIGS. 2A through 2D.

If the relative positions of T3, T4 and T5 remain with T4 between T3 and T5, then when bistable multivibrator 40 is clocked at T4, its data input 38 will be in the logical "one" state and its first output 46 will remain in the logical "one" state. When said first output 46 is in the logical "one" state, there is insufficient voltage difference between the voltage at first output 46 and positive voltage source 24 to drive sufficient current through resistor 48 and first light emitting diode 54 to light diode 54. FIG. 2E represents the signal at first output 46 under the conditions described above wherein T4 falls between T3 and T5. Similarly FIG. 2F represents the signal at second output 50 under the same conditions. Since the signal at first output 46 does not change from logical "one", the signal at second output 50, which is always the opposite of the signal at first output 46, will remain unchanged at logical "zero". Since second output 50 remains in the low state (logical zero) there will be sufficient current flow through light emitting diode 56 to cause it to emit light. The light from diode 56 is a visual indication that the data storage device is in alignment.

If due to a change in the mechanism of the data storage device, the elapsed time from initiation of movement of the head from its power-off resting position to the position sensed by the means for position sensing becomes less than T3, a different result is attained. Such a condition is illustrated in FIGS. 2G through 2I viewed in conjunction with FIGS. 2A through 2C. FIG. 2G represents the signal from the position sensing means under circumstances where that signal changes from logical "one" to logical "zero" before T3. The change in the signal from logical "one" to logical "zero" on clock input 44 of bistable multivibrator 40 in this case occurs at T2. At T2, the signal at data input 38 is at logical "zero" (see FIG. 2C). First output 46 therefore changes to logical "zero" if bistable multivibrator 40 is clocked at T2, as indicated in FIG. 2G. Similarly, if bistable multivibrator 40 is clocked at T2, second output 50 also changes state, in its case from logical "zero" to logical "one", as illustrated in FIG. 2I. The effect of the change of state of both outputs 46 and 50 is that first light emitting diode 54 lights, and second light emitting diode 56 stops emitting light. This forms a visual indication of misalignment of the read-write head.

A similar analysis can be made to demonstrate that exactly the same results would occur if a change in the mechanism resulted in an increase in the elapsed time from initiation of movement of the read-write head from it power-off rest position to the time when the means of sensing position changes state such that the change of state occurred after T5. The only conditions where bistable multivibrator 40 would not change is first output 46 to logical "zero" and its second output 50 to logical "one" in response to a change from logical "one" to logical "zero" on its clock input 44 is when such a signal on said clock input 44 occurs during the window between T3 and T5, i.e., when the data input 38 is at logical "one".

The first and second monostable multivibrators automatically reset themselves to the condition of being ready to perform their timing functions. The bistable multivibrator, however, must be initialized such that first output 46 is in the logical "one" state and second output 50 is in the logical "zero" state prior to the monitoring process of the present invention. This can be accomplished in many ways; a simple method is to automatically reset the bistable multivibrator when power is turned on through a circuit connecting the negative voltage reset terminal on the multivibrator circuit to the positive voltage source through a resistor, and to the negative voltage source through a capacitor.

The application of the process of the present invention thus allows a monitoring of the alignment of the read-write head in a data storage device every time power is applied to the device, and data subsequently accessed. The light emitting diodes 54 and 56 will either remain in the same state indicating alignment is OK (diode 56 lit and diode 54 off), or will, on a sufficient discrepancy between the actual and expected elapsed times for the read-write head to reach a predetermined position, reverse their states indicating misalignment (diode 56 off and diode 54 lit). The visual indication of diodes 56 and 54 provides the user with an immediately available indication of alignment problems, and allows the user to have the alignment of the data storage device corrected immediately upon the development of an alignment problem.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method for monitoring alignment of a read-write transducer head with respect to the tracks of data in a storage device having magnetic storage of data on magnetic recording media wherein the method comprises the steps of:
   a. activating a first timing means for measuring a fixed interval of time simultaneously with the initiation of the movement of the read-write head from its resting position;
   b. activating a second timing means for measuring a fixed interval of time at the instant in time when said first means for measuring a fixed interval of time has completed its respective time interval;
   c. sensing the instant in time when the read-write head has moved to a predetermined position a distance away from said resting position by utilizing a means for position sensing; and
   d. checking the status of said second timing means for measuring a fixed interval of time at the instant the read-write head has moved to said predetermined position and, if said second means for measuring a fixed interval of time has not yet been actuated, or if said second means for measuring a fixed interval of time has been activated and has completed the timing of its respective time interval, producing a signal signifying potential misalignment of the read-write head.

2. The method of claim 1, further comprising the step of exciting an indicator in response to said signal signifying potential misalignment of the read-write head.

3. The method of claim 2, wherein said indicator comprises a light emitting diode.

4. The method of claim 1, further comprising generating a signal signifying correct alignment of the read-write head when said signal signifying potential misalignment is absent, and further comprising the exciting of an indicator in response to said signal signifying correct alignment of the read-write head.

5. A method of claim 4 wherein said indicator comprises a light emitting diode.

6. The method of claim 1 wherein said first means for measuring a fixed interval of time, and said second means for measuring a fixed interval of time each comprise a monostable multivibrator.

7. The method of claim 1 wherein said checking of the status of said second means for measuring a fixed interval of time at the instant the read-write head has moved to said predetermined position is accomplished by use of a bistable multivibrator with its data input connected to the output of said second means for measuring a fixed interval of time, and with its clock input connected to said means for position sensing.

8. A method for monitoring alignment of a read-write head in a data storage device comprising comparing the actual time required for the head to move from its resting position to a predetermined position, with a predetermined value for that time period, and producing a signal if said actual time required for the head to so move is different from said predetermined value for that time period by an amount of time exceeding a predetermined limit.

* * * * *